(12) United States Patent
Fujimoto

(10) Patent No.: US 9,388,085 B2
(45) Date of Patent: Jul. 12, 2016

(54) TITANIUM COMPOUND-CONTAINING CORE-SHELL POWER

(71) Applicant: Yageo Corporation, Kaohsiung (TW)

(72) Inventor: Masayuki Fujimoto, Kaohsiung (TW)

(73) Assignee: YAGEO CORPORATION, Kaohsiung (TW)

( * ) Notice: Subject to any disclaimer, the term of this patent is extended or adjusted under 35 U.S.C. 154(b) by 0 days.

(21) Appl. No.: 14/472,595

(22) Filed: Aug. 29, 2014

(65) Prior Publication Data
US 2016/0039721 A1 Feb. 11, 2016

(30) Foreign Application Priority Data
Aug. 6, 2014 (TW) ............... 103126921 A

(51) Int. Cl.
| | | |
|---|---|---|
| B05D 7/00 | (2006.01) |
| C04B 35/628 | (2006.01) |
| C04B 35/58 | (2006.01) |
| C04B 35/462 | (2006.01) |
| C04B 35/468 | (2006.01) |
| C04B 35/47 | (2006.01) |
| C04B 35/626 | (2006.01) |
| C04B 35/638 | (2006.01) |
| C01G 23/00 | (2006.01) |
| C01B 21/076 | (2006.01) |

(52) U.S. Cl.
CPC ......... *C04B 35/62821* (2013.01); *C01B 21/076* (2013.01); *C01G 23/005* (2013.01); *C01G 23/006* (2013.01); *C04B 35/462* (2013.01); *C04B 35/4682* (2013.01); *C04B 35/47* (2013.01); *C04B 35/58014* (2013.01); *C04B 35/6268* (2013.01); *C04B 35/638* (2013.01); *C01P 2002/72* (2013.01); *C01P 2002/85* (2013.01); *C01P 2004/04* (2013.01); *C01P 2004/80* (2013.01); *C04B 2235/3203* (2013.01); *C04B 2235/3236* (2013.01); *C04B 2235/3418* (2013.01); *C04B 2235/3886* (2013.01); *C04B 2235/6582* (2013.01); *C04B 2235/6584* (2013.01); *C04B 2235/761* (2013.01); *C04B 2235/765* (2013.01); *C04B 2235/80* (2013.01)

(58) Field of Classification Search
CPC ....... B01J 2/003; B82Y 30/00; C01P 2004/64
USPC .......................... 427/212, 215, 218; 428/403
See application file for complete search history.

(56) References Cited

U.S. PATENT DOCUMENTS

2010/0234209 A1* 9/2010 Furukawa .............. B01J 35/004
 502/100

* cited by examiner

*Primary Examiner* — Noah Wiese
(74) *Attorney, Agent, or Firm* — Abelman, Frayne & Schwab

(57) ABSTRACT

A titanium compound-containing core-shell powder includes a plurality of core-shell particles, each of which includes a core body and a shell layer encapsulating said core body. The core body is electrically conductive. The shell layer includes a crystal that is selected from titanate oxides having a perovskite structure and titanate oxides having a spinel structure. The core body and the shell layer are chemically bonded to each other.

2 Claims, 11 Drawing Sheets

US 9,388,085 B2

TITANIUM COMPOUND-CONTAINING CORE-SHELL POWER

CROSS-REFERENCE TO RELATED APPLICATION

This application claims priority of Taiwanese Patent Application No. 103126921, filed on Aug. 6, 2014.

FIELD OF THE INVENTION

This invention relates to a core-shell powder, a method of making the same, and a sintered body, more particularly to a titanium compound-containing core-shell powder having core-shell particles, each of which includes a core body and a shell layer chemically bonded to the core body.

BACKGROUND OF THE INVENTION

A conventional multi-layer ceramic capacitor (MLCC) includes a plurality of metal layers and a plurality of dielectric layers that are alternately disposed with the metal layers. Generally, the capacitance of the MLCC is increased with a decrease of dielectric layer thickness and an increase of number of dielectric layers.

A conventional method of making a dielectric layer involves a step of sintering a dielectric powder with ferroelectric or paraelectric property. A typical example of the dielectric powder with ferroelectric property is barium titanate powder.

In order to obtain a thinner dielectric layer, the barium titanate powder to be sintered is required to have a particle size that is as small as possible. However, the barium titanate powder with a small particle size has a tendency to aggregate or agglomerate into large particles, which hinders the formation of a thin dielectric layer.

In order to overcome the aforesaid problem, it has been proposed to use a core-shell powder having core-shell particles to make the dielectric layer. Each core-shell particle includes a conductive core body and a shell composed of a plurality of dielectric sub-particles attached to the conductive core body.

However, since the shell formed from the dielectric sub-particles has a loose structure, the capacitance constant of the shell of each core-shell particle is relatively low which is adverse for application to the MLCC.

SUMMARY OF THE INVENTION

Therefore, an object of the present invention is to provide a core-shell powder that can overcome at least one of the aforesaid drawbacks associated with the prior art.

According to one aspect of this invention, there is provided a titanium-containing core-shell powder that comprises a plurality of core-shell particles. Each of the core-shell particles includes a core body and a shell layer encapsulating the core body. The core body is electrically conductive. The shell layer includes a crystal that is selected from the group consisting of titanate oxides having a perovskite structure and titanate oxides having a spinel structure. The core body and the shell layer are chemically bonded to each other.

According to another aspect of this invention, there is provided a method of making a titanium compound-containing core-shell powder. The method comprises: preparing a titanium compound powder and an inorganic salt powder; mixing the titanium compound powder and the inorganic salt powder to form a preformed powder; and subjecting the preformed powder to calcination to cause solid-state reaction of particle surfaces of the titanium compound powder with the inorganic salt powder to form a titanium compound-containing crystalline shell layer on each particle surface of the titanium compound powder.

According to yet another aspect of this invention, there is provided a titanium compound-containing sintered body that comprises a plurality of core-shell particles, each of which includes a core body and a shell layer encapsulating the core body. The core body is electrically conductive. The shell layer includes a crystal that is selected from the group consisting of titanate oxides having a perovskite structure and titanate oxides having a spinel structure. The core body and the shell layer are chemically bonded to each other. The shell layers of adjacent ones of the core-shell particles are interbonded to one another through the sintering process.

BRIEF DESCRIPTION OF THE DRAWINGS

In drawings which illustrate an embodiment of the invention.

DETAILED DESCRIPTION OF THE EMBODIMENTS

The embodiment of a core-shell powder according to the present invention includes a plurality of core-shell particles.

Figure 1:
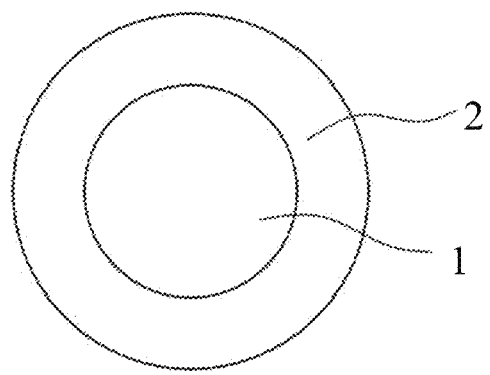
FIG. 1 is a schematic view of the embodiment of a titanium-containing core-shell particle according to the present invention.

Referring to FIG. 1, each of the core-shell particles includes a core body 1 and a shell layer 2 that encapsulates the core body 1. The core body 1 is electrically conductive. The shell layer 2 includes a crystal that is selected from the group consisting of titanate oxides having a perovskite structure and titanate oxides having a spinel structure. The core body 1 and the shell layer 2 are chemically bonded to each other.

The core body 1 of each of the core-shell particles is made from TiN.

The crystal may be selected from the group consisting of barium titanate, strontium titanate, and lithium titanate.

The shell layer 2 of each of the core-shell particles further includes an oxide that is doped in the crystal.

In an example of this invention, the crystal is barium titanate or strontium titanate.

In another example of this invention, the crystal is lithium titanate, and has a spinel structure.

The method of making the embodiment of the core-shell powder includes the steps of: preparing a titanium compound powder and an inorganic salt powder; mixing the titanium compound powder and the inorganic salt powder to form a preformed powder; and subjecting the preformed powder to calcination to cause solid-state reaction of particle surfaces of the titanium compound powder with the inorganic salt powder to form a titanium compound-containing crystalline shell layer on each particle surface of the titanium compound powder.

The preformed powder is formed by mixing the titanium compound powder and the inorganic salt powder in a solvent, followed by drying to remove the solvent. The solvent may be selected from the group consisting of water, alcohol, toluene, and isopropanol.

Preferably, the titanium compound powder is made from TiN. The inorganic salt powder is a salt containing cations that are selected from the group consisting of barium ions, strontium ions, lithium ions and combinations thereof, and anions that are selected from the group consisting of carbonates, hydroxides, phosphates and combinations thereof. Examples of the inorganic salt powder include barium carbonate, strontium carbonate, lithium carbonate, hydroxide, barium phosphonate, strontium phosphonate, and lithium phosphonate. In the solid-state reaction of the particle surfaces of the titanium compound powder with the inorganic salt powder, the cations of the inorganic salt powder replace the titanium atoms on the particle surfaces of the titanium compound powder, and react with the replaced titanium atoms during the calcination to form the titanium compound-containing crystalline shell layer. In one embodiment, the inorganic salt powder is barium carbonate powder and may be mixed with a sintering additive before mixing with the titanium compound powder. Examples of the sintering additive include strontium carbonate, calcium carbonate, magnesium carbonate, and lithium carbonate.

Preferably, the calcination is conducted at a partial pressure of oxygen greater than 10 ppm and less than 10000 ppm, more preferably, the partial pressure of oxygen is less than $10^{-8}$ atm, such that the cations of the inorganic salt powder not only react with the replaced titanium atoms but also with the oxygen present in an atmosphere of the calcination to form the titanium compound-containing crystalline shell layer.

The core-shell particles of this embodiment can be used to produce a titanium compound-containing sintered body. In the sintered body, the shell layers 2 of adjacent ones of the core-shell particles are interbonded to one another through the sintering process.

The method of making the MLCC includes the steps of: milling the core-shell powder of the embodiment in a solvent; mixing the core-shell powder and an organic binder (such as poly(vinyl alcohol) (PVA) or poly(vinyl butyral) (PVB)) after the milling so as to form a slurry; casting the slurry to form a green sheet; printing a metal electrode layer on the green sheet to form a printed green sheet; cutting the printed green sheet to form a plurality of sheets; stacking the sheets to form a preformed bar; cutting the preformed bar into a desired size; removing the organic binder from the preformed bar so as to form a chip; sintering the chip at a temperature ranging from 1100° C. to 1300° C. so as to form a titanium compound-containing sintered brick; dipping copper electrodes on two opposite sides of the titanium compound-containing sintered brick; and electroplating a nickel protecting layer and a tin layer on each of the copper electrodes so as to form the MLCC that is ready to be electrically connected to an external power source.

It is noted that the core-shell powder of the present invention does not need to be sintered at the temperature greater than 1300° C. in order to form the titanium compound-containing sintered brick.

The titanium compound-containing sintered brick includes a plurality of the core-shell particles that are bonded to one another through surface interfusion. The shell layers 2 of adjacent ones of the core-shell particles are interbonded to one another through the sintering process.

The shell layer 2 of each of the core-shell particles further includes an oxide or a sintering additive that is doped in said crystal.

The shell layer of 2 each of the core-shell particles is dielectric.

The merits of the embodiment of this invention will become apparent with reference to the following Examples.

Example 1

A barium carbonate powder and a TiN powder were mixed in an alcohol and milled in a ball mill with zirconium dioxide balls having a diameter of 0.1 mm so as to form a preformed powder in the alcohol. The mole ratio of the barium carbonate powder to the TiN powder was 1:5.

The preformed powder was dried using nitrogen gas, and was subjected to calcination for 30 minutes in a chamber at a partial pressure of oxygen of $9.3 \times 10^{-9}$ atm and a temperature of 800° C., such that particles surfaces of particles of the TiN powder and cations of the barium carbonate powder underwent solid-state reaction to form a titanium-containing crystalline shell layer on each particle surface of the particles of the TiN powder, thereby forming the core-shell particles.

100 parts by weight of the core-shell particles thus formed were milled in a solvent, and were then mixed with 15 parts by weight of an organic binder and 1 part by weight of a $SiO_2$ powder to form a slurry. The slurry was coated to form a green sheet using a coating machine. The green sheet was punched to form a plurality of pellets. The pellets were heated for 60 minutes at a partial pressure of oxygen greater than 0.015 atm and a temperature of 450° C. to remove the organic binder. The pellets were sintered at a temperature of 1250° C. for 30 minutes under an atmosphere containing $N_2$ and $H_2$ ($H_2$ was 0.01%) to form a sintered body of the core-shell particles.

Example 2

A strontium carbonate powder and a TiN powder were mixed in an alcohol and milled in a ball mill with zirconium dioxide balls having a diameter of 0.1 mm so as to form a preformed powder in the alcohol. The mole ratio of the strontium carbonate powder to the TiN powder was 3:10.

The preformed powder was dried using $N_2$ gas, and was subjected to calcination for 80 minutes in a chamber at a partial pressure of oxygen of $3.6 \times 10^{-9}$ atm and a temperature of 1000° C., such that particles surfaces of particles of the TiN powder and cations of the strontium carbonate powder underwent solid-state reaction so as to form a titanium-containing crystalline shell layer on each particle surface of the particles of the TiN powder, thereby forming the core-shell particles.

100 parts by weight of the core-shell particles thus formed were milled in a solvent, and were then mixed with 15 parts by weight of an organic binder and 1 part by weight of a $SiO_2$ powder to form a slurry. The slurry was coated to form a green sheet using a coating machine. The green sheet was punched to form a plurality of pellets. The pellets were heated for 60 minutes at a partial pressure of oxygen greater than 0.015 atm and a temperature of 450° C. to remove the organic binder. The pellets were sintered at a temperature of 1250° C. for 30 minutes under an atmosphere containing $N_2$ and $H_2$ ($H_2$ was 0.01%) to form a sintered body of the core-shell particles.

Example 3

A lithium carbonate powder and a TiN powder were mixed in an alcohol and milled in a ball mill with zirconium dioxide balls having a diameter of 0.1 mm to form a preformed powder in the alcohol. The mole ratio of the lithium carbonate powder to the TiN powder was 3:10.

The preformed powder was dried using $N_2$ gas, and was subjected to calcination for 5 hours in a chamber at a partial pressure of oxygen of $9.8 \times 10^{-9}$ atm and a temperature of 900° C., such that particles surfaces of particles of the TiN powder and cations of the lithium carbonate powder underwent solid-state reaction so as to form a titanium-containing crystalline shell layer on each particle surface of the particles of the TiN powder, thereby forming the core-shell particles.

[Analysis Results]

Figure 2:
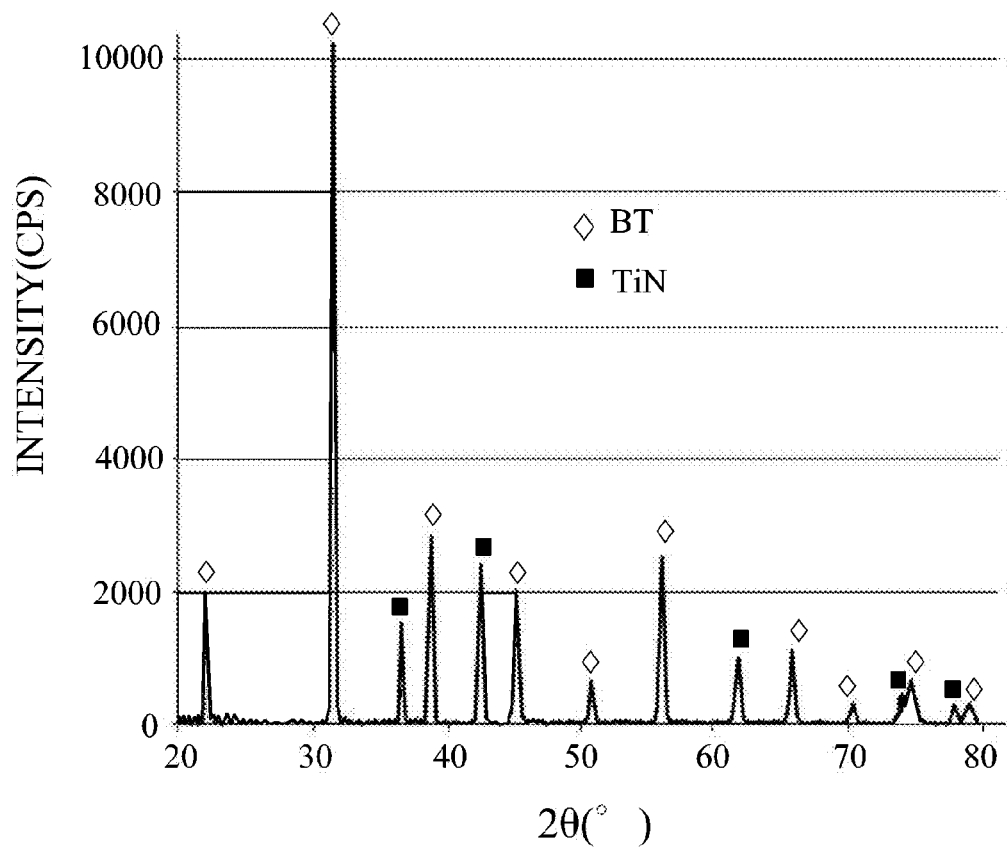
FIG. 2 is an X-ray diffraction analysis diagram of core-shell particles of Example 1.

FIG. 2 is an X-ray diffraction pattern of the core-shell particles of Example 1. Peaks which are marked with square symbols in FIG. 2 represent peaks of TiN, and peaks which are marked with diamond symbols represent peaks of barium titanate. The results show that the core-shell particles of Example 1 comprise only TiN and barium titanate, and are free of impurities or by-products.

The crystal of the shell layer of Example 1 has a c/a ratio of about 1.006, where "c" and "a" are lattice parameters of the crystal. Moreover, the shell layer has a tetragonal phase, and exhibits excellent ferroelectricity.

Figure 3:
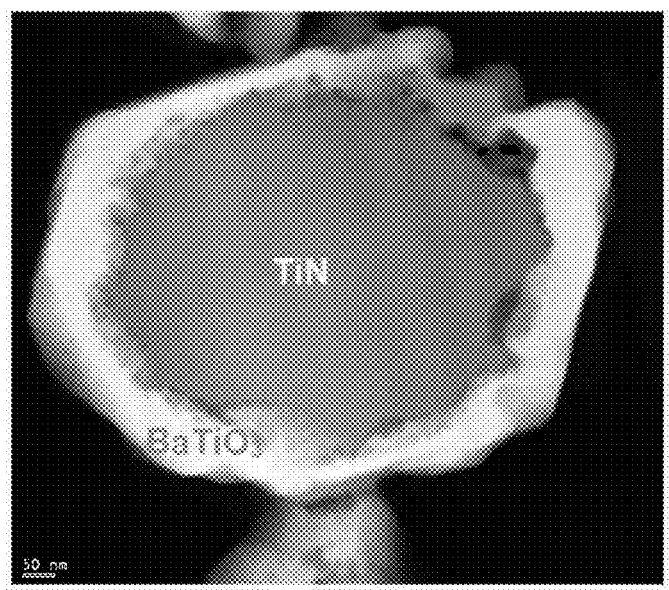
FIG. 3 is a STEM HAADF (scanning transmission electron microscopy high-angle annular dark-field) image of the core-shell particles of Example 1.

FIG. 3 is a STEM HAADF (scanning transmission electron microscopy high-angle annular dark-field) image of an STEM sample containing the core-shell particle of Example 1. The core-shell particle of Example 1 was embedded into a body of an epoxy resin to form a crude sample, followed by thinning the crude sample into the STEM sample using FIB (focused ion beam) techniques. The bright region shown in FIG. 3 indicates the presence of barium contained in the shell layer of the core-shell particle of Example 1.

Figure 4:
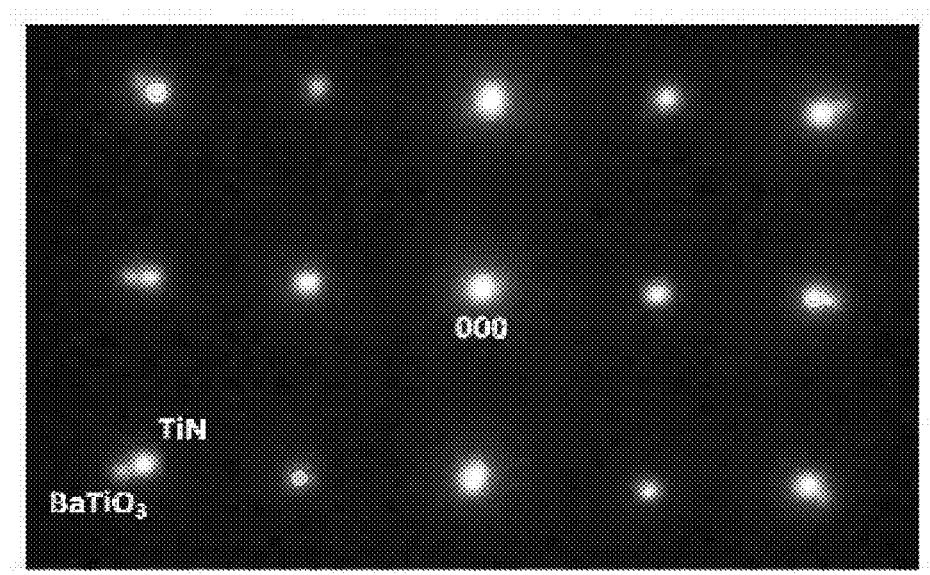
FIG. 4 is an electron diffraction pattern of the core-shell particles of Example 1.

FIG. 4 is an electron diffraction pattern of the core-shell particles of Example 1. The results demonstrate that the core-shell particle of Example 1 includes $BaTiO_3$ and TiN.

Figure 5:
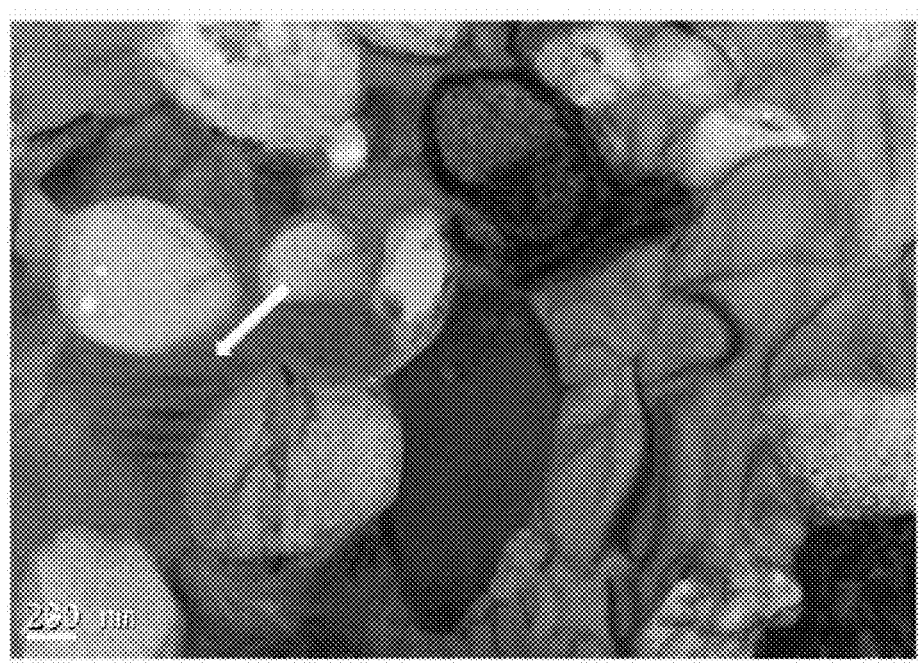
FIG. 5 is a TEM (transmission electron microscopy) image of a sintered body made of the core-shell particles of Example 1, and ferroelectric 90° domains of barium titanate are indicated by an arrow.

FIG. 5 is a TEM (transmission electron microscopy) image of the sintered body of the core-shell particles of Example 1. 90° ferroelectric domain is indicated by an arrow as the evidence of formation of tetragonal ferroelectric barium titanate.

Figure 6:
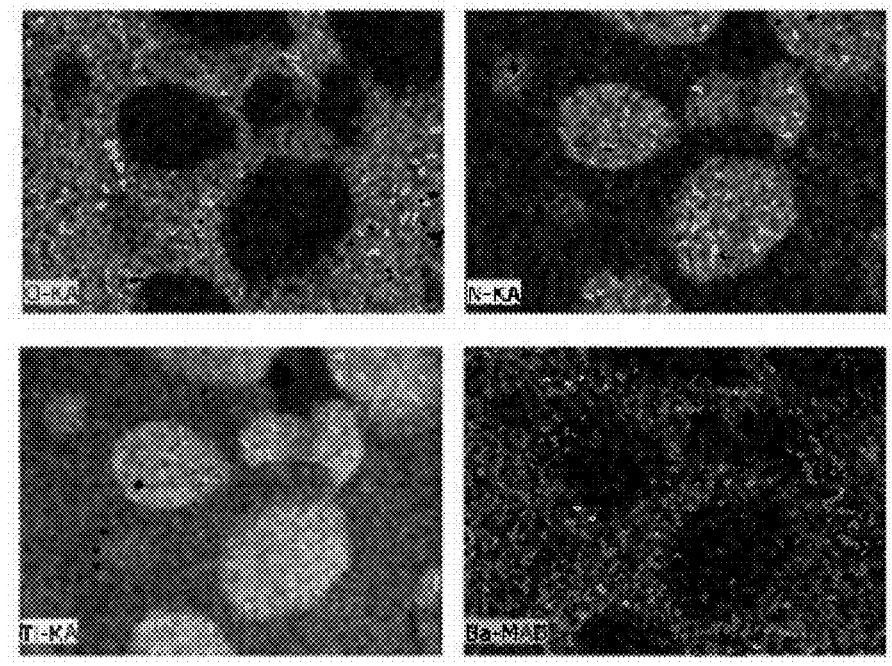
FIG. 6 is an STEM EDS (energy dispersive x-ray spectrometry) chemical compositional mapping of FIG. 5, and images of elemental distribution oxygen (O—K$\alpha$), nitrogen (N—K$\alpha$), titan (Ti—K$\alpha$) and Barium (Ba—M$\alpha\beta$) are indicated respectively.

FIG. 6 is an STEM EDS (energy dispersive x-ray spectrometry) chemical compositional mapping of FIG. 5. Images of elemental distribution oxygen (O—Kα), nitrogen (N—Kα), titan (Ti—Kα) and Barium (Ba—Maβ) are indicated respectively. The results show that the sintered body of the core-shell particles of Example 1 includes TiN and $BaTiO_3$ which has a tetragonal phase.

Figure 7:
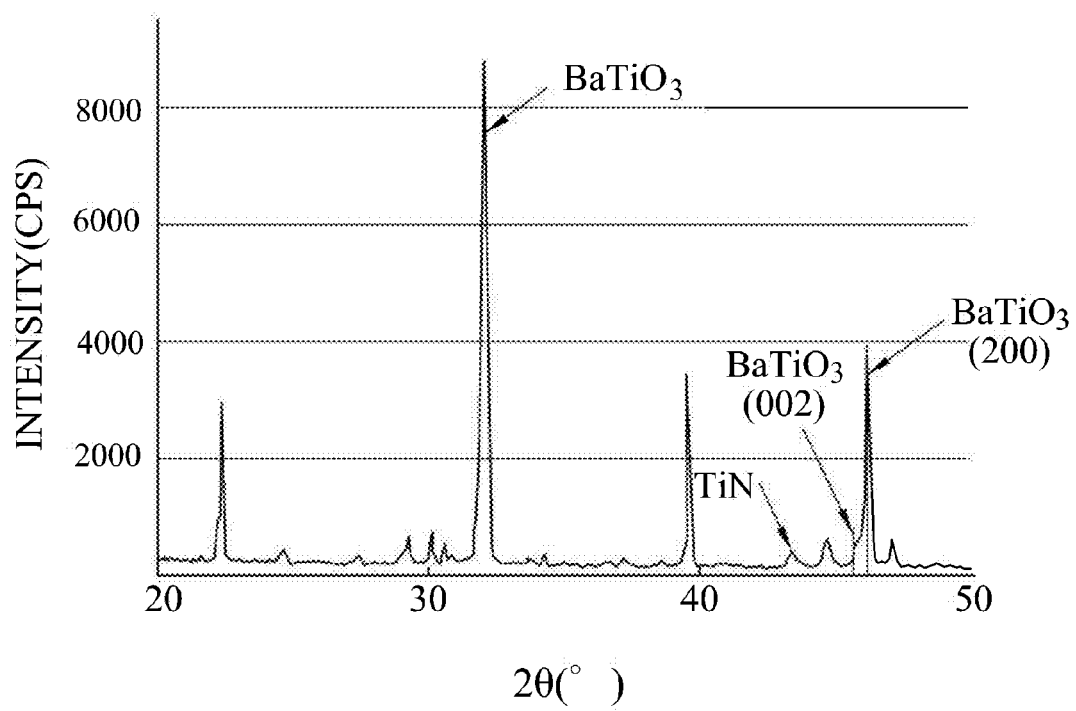
FIG. 7 is an X-ray diffraction spectrum of the sintered body made of the core-shell powder of Example 1.

FIG. 7 is an X-ray diffraction pattern of the sintered body made of the core-shell particles of Example 1. Peaks corresponding to TiN and $BaTiO_3$ having a tetragonal phase can be found in FIG. 7.

Figure 8:
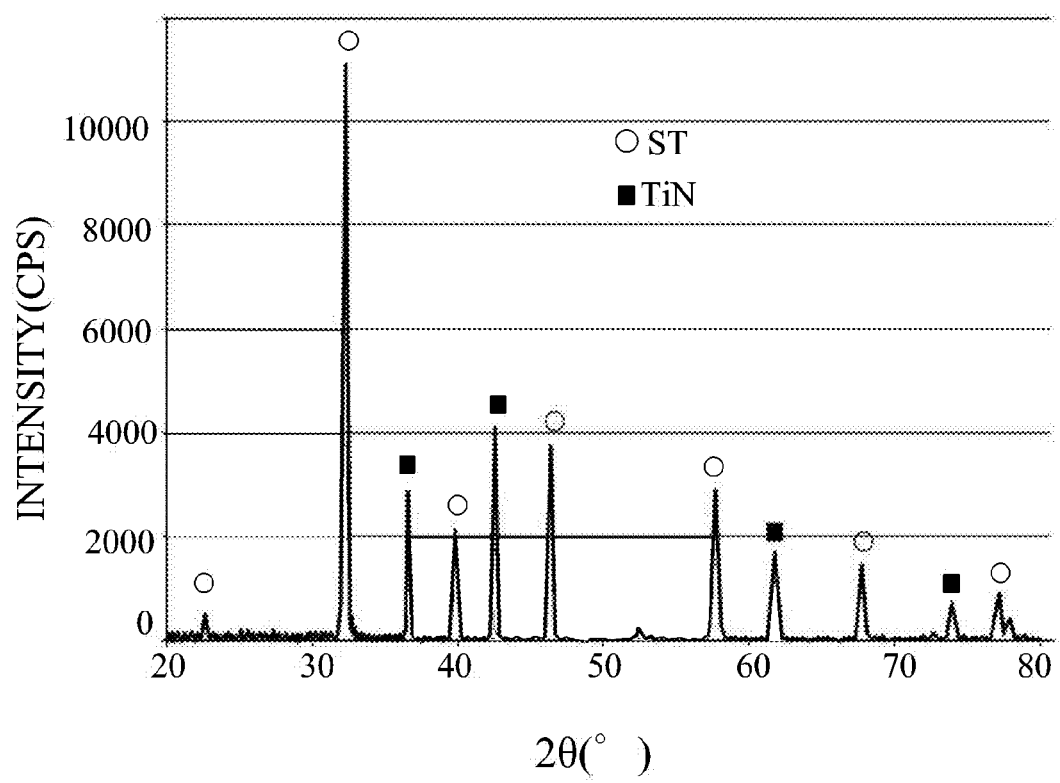
FIG. 8 is an X-ray diffraction spectrum of core-shell particles of Example 2.

FIG. 8 is an X-ray diffraction pattern of the core-shell particles of Example 2. Peaks which are marked with square symbols in FIG. 8 represent peaks of TiN, and peaks which are marked with circle symbols represent peaks of strontium titanate. The results show that the core-shell particles of Example 2 comprise only TiN and strontium titanate, and are free of impurities or by-products.

Figure 9:
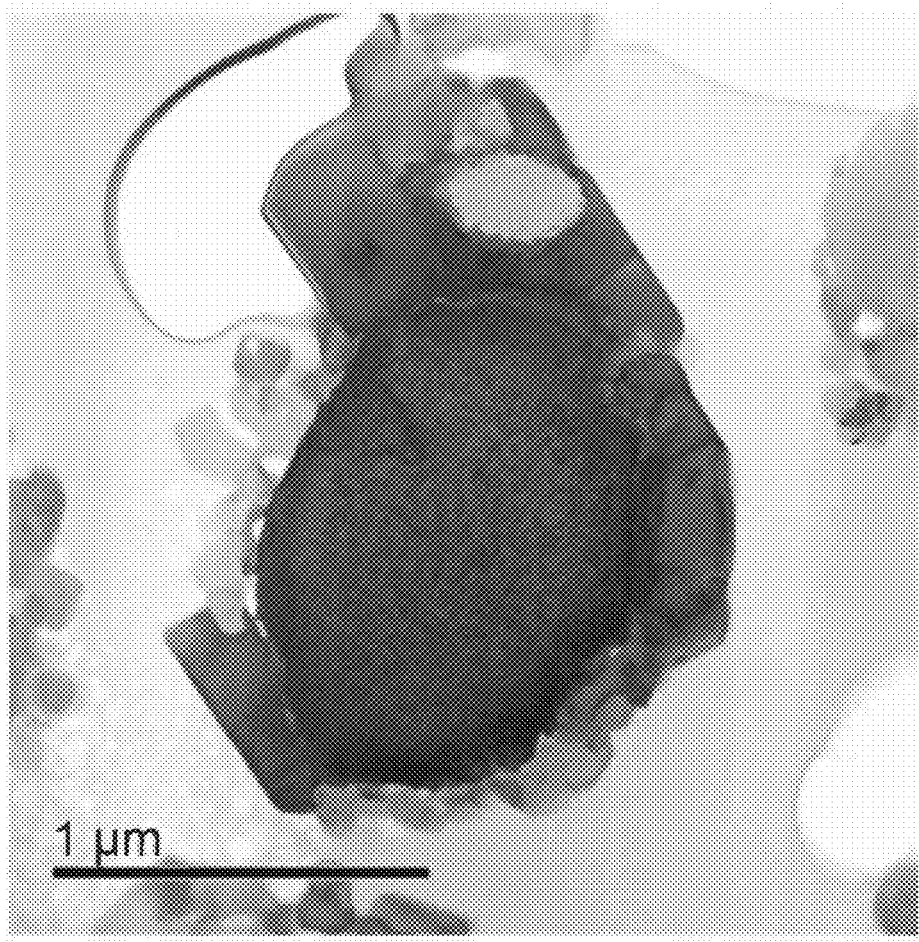
FIG. 9 is a TEM cross-sectional image of the core-shell particles of Example 2.

FIG. 9 is a TEM cross-sectional image of the core-shell particles of Example 2.

Figure 10:
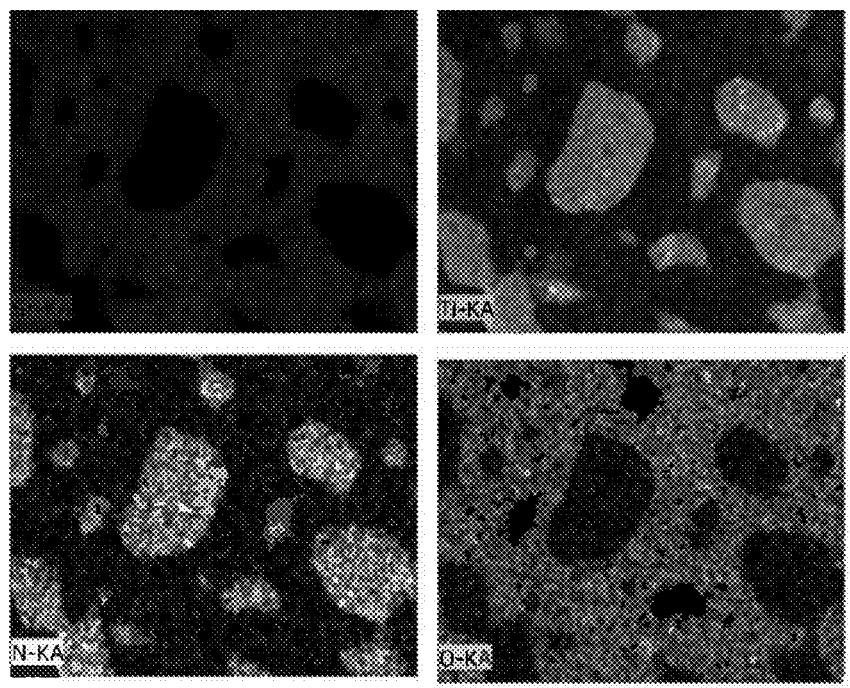
FIG. 10 is an STEM EDS (energy dispersive x-ray spectrometry) chemical compositional mapping of FIG. 9, and images of elemental distribution strontium (Sr—K$\alpha$), titan (Ti—K$\alpha$), oxygen (O—K$\alpha$) and nitrogen (N—K$\alpha$) are indicated respectively.

FIG. 10 is an STEM EDS (energy dispersive x-ray spectrometry) chemical compositional mapping of FIG. 9. Images of elemental distribution strontium (Sr—Kα), titan (Ti—Kα), oxygen (O—Kα) and nitrogen (N—Kα) are indicated respectively.

Figure 11:
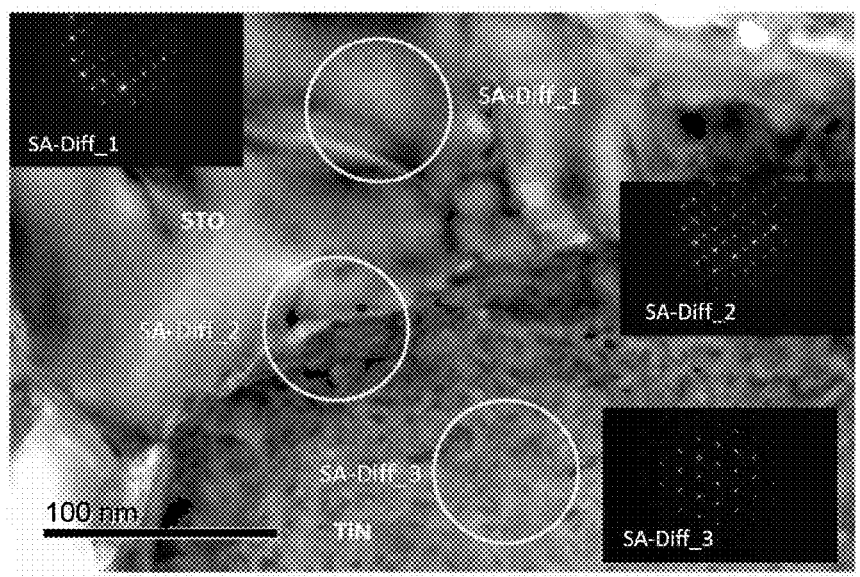
FIG. 11 is a TEM image of a cross section of the core-shell particles of Example 2, and selected area electron diffraction (SA-Diff) patterns of three regions encircled in the TEM image.

FIG. 11 is a TEM image showing a cross-section of the core-shell particles of Example 2. The insets shown in FIG. 11 are selected area electron diffraction (SA-Diff) patterns of three regions encircled in the TEM image of FIG. 11, respectively. The results of the electron diffraction patterns show that the core-shell particles of Example 2 include strontium titanate and TiN.

Figure 12:
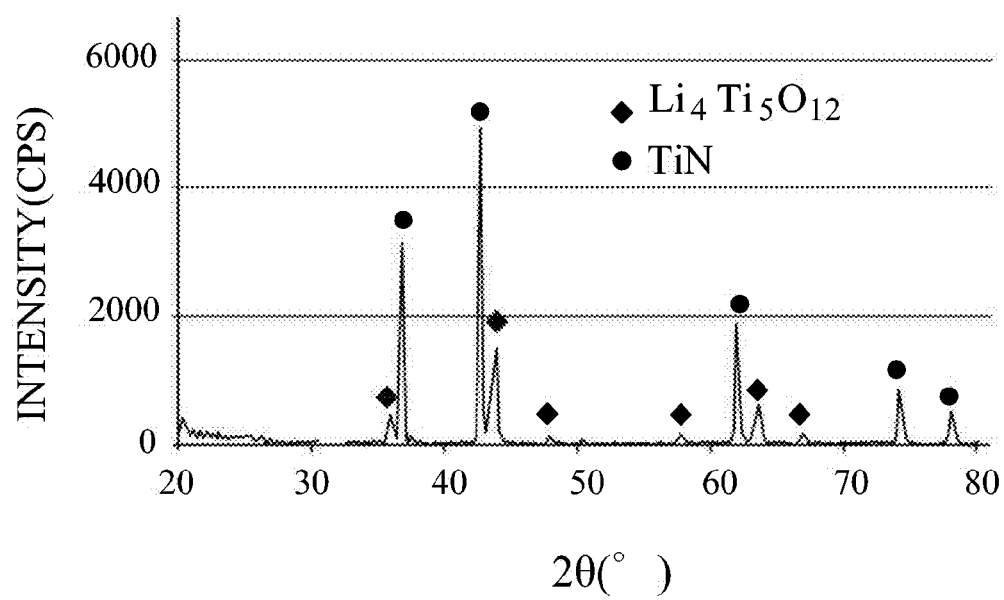
FIG. 12 is an X-ray diffraction analysis diagram of core-shell particles of Example 3.

FIG. 12 is an X-ray diffraction of the core-shell particles of Example 3. Peaks which are marked with circle symbols in FIG. 12 represent peaks of TiN, and peaks which are marked with diamond symbols represent peaks of lithium titanate. The results show that the core-shell particles of Example 3 comprise only TiN and lithium titanate, and are free of impurities or by-products.

Figure 13:
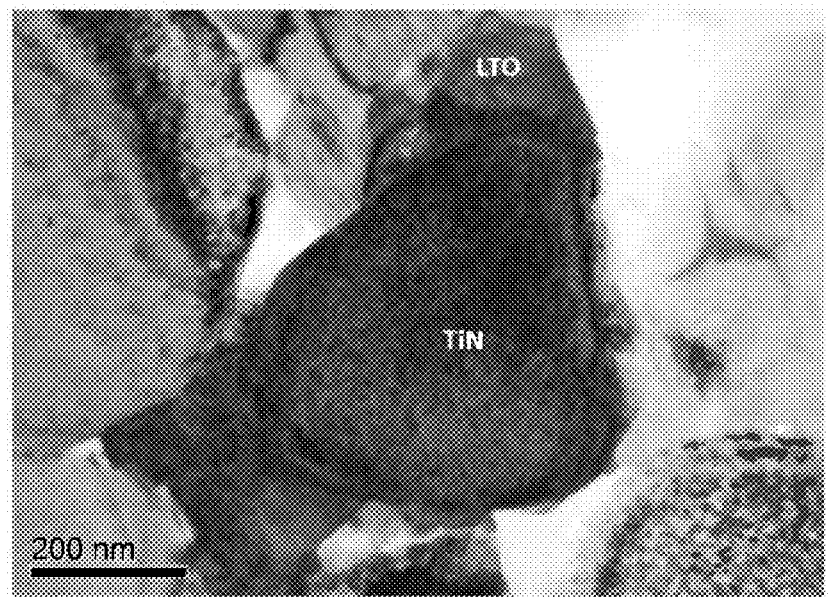
FIG. 13 is a TEM image of the core-shell particles of Example 3.
Figure 14:
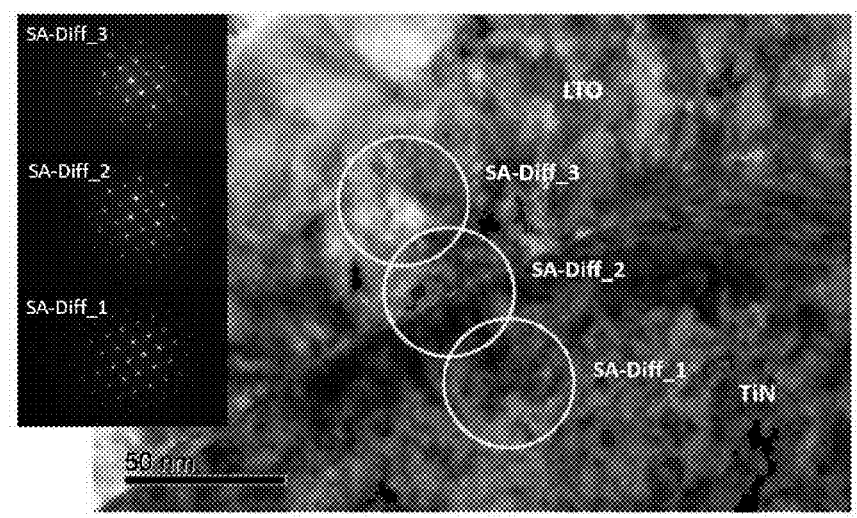
FIG. 14 is a TEM image of a cross section of the core-shell particles of Example 3, and selected area electron diffraction patterns (SA-Diff) of three regions encircled in the TEM image.

FIG. 13 is a TEM image of the core-shell particles of Example 3. FIG. 14 is a TEM image showing a cross-section of the core-shell particles of Example 3. The insets shown in FIG. 14 are selected area electron diffraction (SA-Diff) of three regions encircled in the TEM image of FIG. 14, respectively. The results of the electron diffraction patterns show that the core-shell particles of Example 3 include $Li_4Ti_5O_{12}$ (LTO) and TiN.

By subjecting the preformed powder of the mixture of the titanium compound powder and the inorganic salt powder to calcination and solid-state reaction to form the shell layer 2 encapsulating and interbonded to the core body 1 according to the method of the present invention, the aforesaid drawbacks associated with the prior art can be eliminated.

While the present invention has been described in connection with what is considered the most practical embodiment, it is understood that this invention is not limited to the disclosed embodiment but is intended to cover various arrangements included within the spirit and scope of the broadest interpretation and equivalent arrangements.

What is claimed is:

1. A titanium compound-containing core-shell powder comprising:
a plurality of core-shell particles, each of said core-shell particles including a core body that is made from TiN, and a shell layer encapsulating said core body, said core body being electrically conductive, said shell layer including a crystal that is lithium titanate, and has a spinel structure, said core body and said shell layer being chemically bonded to each other.

2. The core-shell powder of claim 1, wherein said shell layer of each of said core-shell particles further includes an oxide that is doped in said crystal.

* * * * *